Sept. 13, 1960
M. S. GASPARDO
2,952,290
TIRE CHAIN
Filed April 1, 1958
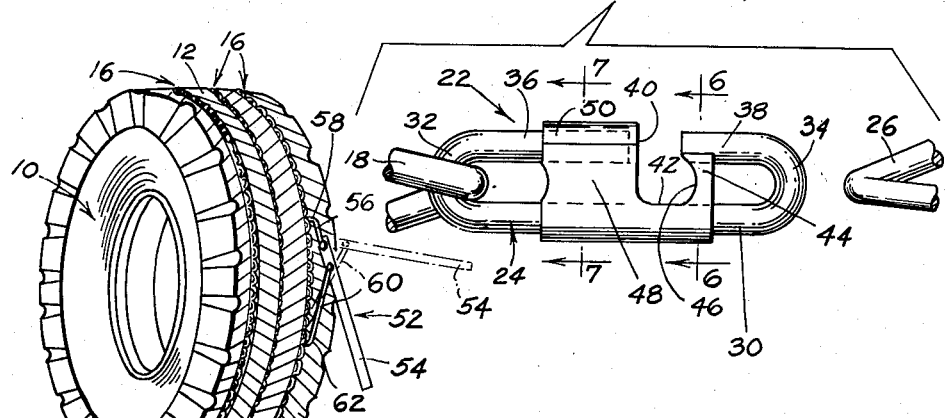
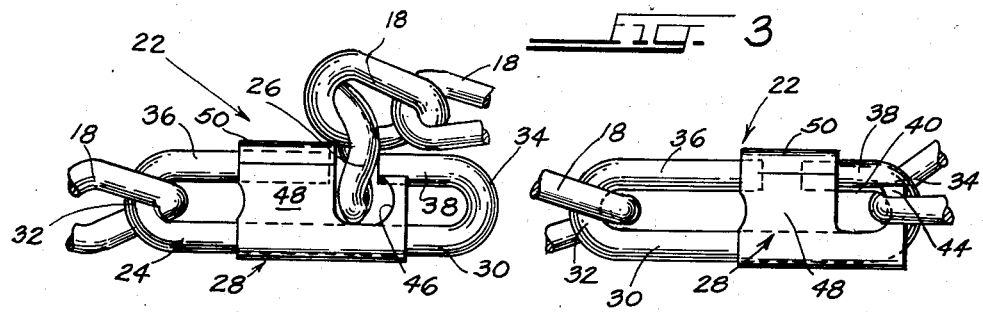
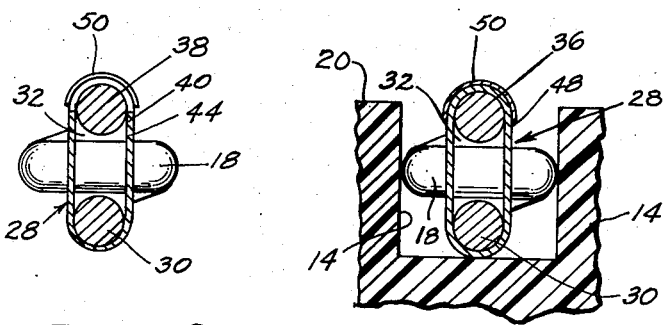
INVENTOR.
MARTIN S. GASPARDO
BY
Smith, Prangley, Baird and Clayton
ATTYS.

United States Patent Office 2,952,290
Patented Sept. 13, 1960

2,952,290

TIRE CHAIN

Martin S. Gaspardo, Long Point, Ill.

Filed Apr. 1, 1958, Ser. No. 725,666

3 Claims. (Cl. 152—208)

The present invention relates to anti-skid devices for use on automobile tires and the like and particularly to an improved connector for mounting the device on the tire.

There are available on the market today tires specifically designed for use on snow covered surfaces and are commonly referred to as "snow tires." Such tires in general are provided with enlarged tread members having substantial spaces therebetween in which snow can be readily packed in order to obtain increased traction thereon. Although such tires are well suited for use on either loose or packed snow, such tires actually provide less traction when used on glazed or ice surfaces than do tires having ordinary tread. In general the loss of traction on glazed or icy surfaces is not so dangerous as the fact that the tires in addition provide very little resistance to side movement whereby to cause skidding and swaying of the associated car on such icy or glazed surfaces.

It has now been found that the traction resisting lateral skidding and swaying on snow tires can be increased by applying a chain of a particular type in the grooves extending circumferentially around such tires. The chains are positioned between adjacent tread members and have only a small portion thereof extending beyond the surface engaging portions of the tread. The presence of such chains does not interfere with the traction action of the snow tires on snow surfaces. However, the presence of the chain naturally increases traction resisting side motion or skidding whereby to improve the control properties of the tires on glazed and icy surfaces. Chains of such type are a substantial improvement over prior chains in that they are quiet in operation, do not give a bumpy and uneven ride and the chain lasts substantially indefinitely without any injury to the associated tire.

Accordingly, it is an improtant object of the present invention to provide an improved anti-skid structure for use with automobile tires and the like.

Another object of the invention is to provide in combination with snow tires having circumferential grooves therein an improved chain for use on glazed and icy surfaces.

Still another object of the invention is to provide in a chain of the type set forth an improved connector to facilitate ready mounting of the chain on a tire.

A further object of the invention is to provide a connector for a tire chain of the type set forth in which the connector positively locks the chain on the tire, the connector having good wear resistance during use whereby to prolong the useful life of the tire chain.

These and other objects and advantages of the invention will be better understood from the following description when taken in conjunction with the accompanying drawing. In the drawing wherein like reference numerals have been utilized to designate like parts throughout:

Figure 1 is a perspective view of a snow tire having circumferentially extending grooves in the tread surface thereof within which are disposed anti-skid tire chains made in accordance with and embodying the principles of the present invention;

Figure 2 is an enlarged fragmentary view illustrating particularly the connector of the present invention and showing the parts thereof separated immediately prior to interlocking of the connecting links;

Figure 3 is a top plan view of one of the connecting links and the associated lock member illustrated in Fig. 2;

Figure 4 is a view similar to Figure 2 showing the parts in an intermediate position immediately prior to final locking;

Figure 5 is a view similar to Figures 2 and 4 illustrating the parts in the fully locked position;

Figure 6 is a view in transverse section through the connector substantially as seen in the direction of the arrows along the line 6—6 of Figure 2; and Figure 7 is a view in transverse section through the connector substantially as seen in the direction of the arrows along the line 7—7 of Figure 2 and further showing the connector in operative position within a circumferentially extending groove in a tire tread.

There is shown in Figure 1 of the drawing a tire generally designated by the numeral 10 of the type known as a snow tire. Such tires have relatively heavy tread members 12 which are spaced apart to provide substantial grooves therebetween whereby to provide for traction on snow covered surfaces. Furthermore, certain types of these tires are provided with circumferentially extending grooves 14 (see Figure 7) that extend completely around the tire and are substantially rectangular in cross section. In the form of tire shown in Figure 1 of the drawing, three such circumferentially extending grooves have been illustrated. It is to be understood that certain tires may have fewer and other tires more of these grooves 14.

An anti-skid tire chain generally designated by the numeral 16 has been illustrated as being positioned in each of the three grooves 14 on the tire 10, the chain 16 being made in accordance with and embodying the principles of the present invention. Each of the tire chains 16 is made up of a plurality of integral and interconnected twisted links 18 (see Figure 4). The dimensions of the links 18 are such that when the links are laid in the groove 14, a portion of each link 18 extends beyond the tread surface 20 of the tread members 12. It is to be noted, however, that the major portion of each of the links 18 when applied to a new tire 10 having full treads 12 lies within the groove 14 with only a small portion of the link being exposed. This construction does not interfere with the snow packing and gripping action of the treads 12 when on snow covered surfaces. There also is no objectionable bumping or rattling during operation of the associated vehicle. There is a minimum of wear on the chain itself whereby to prolong the useful life thereof.

On icy or glazed surfaces the portions of the chains 16 extending beyond the tread surfaces 20 grip the ice in such a manner as to prevent side slippage or skidding of the associated automobile. This substantially increases the safety of operation of the vehicle without interfering with the traction properties thereof on snow covered surfaces.

In order to apply the chain 16 to the tire 10 and keep it thereon during operation, an improved connector generally designated by the numeral 22 has been provided. The connector 22 includes an elongated connecting link 24, a second connecting link 26 and a lock member generally designated by the numeral 28. The elongated connecting link 24 includes a first substantially straight side member 30 provided with U-shaped ends 32 and 34 which are in turn formed integral with a pair of shorter side members 36 and 38. The opposed ends of the side members 36 and 38 are spaced apart whereby to form a slot having a width such that it can receive the thickness of the second connecting link 26 therethrough. The U-shaped end 32 receives and is connected to one of the links 18 of the chain 16.

The connecting link 26 is formed substantially like a chain link 18 but has one end thereof slightly enlarged whereby to permit receipt therein of the connecting link and a portion of the lock member as will be more fully set forth hereinafter.

The lock member 28 is tubular in form and oval in cross section as may be best seen by reference to Figure 7. The internal dimensions of the lock member 28 are such as to receive the elongated connecting link 24 therein. One end of the lock member 28 is cut away to provide a pair of transversely directed surfaces 40 which extend toward the other side of the lock member and terminate in longitudinally extending surfaces 42. Extending upwardly is a pair of hook members 44 which are spaced from the surfaces 40 a distance slightly less than the distance between the ends of members 36 and 38. More specifically, the distance between the hook member 44 and the surface 40 is such as to receive the enlarged end of the link 26 therebetween as is illustrated in Figure 4 of the drawings. When tension is applied to the chain 16, the link 26 bears against and is received in a concave surface 46 in the hook members 44 and serves to urge the entire lock member 28 toward the U-shaped end 34 (see Figure 5). When the connecting link 26 engages the U-shaped end 34, it serves to hold the lock member 28 in the position illustrated in Figure 5. In this position the cylindrical body portion 48 of the lock member 28 effectively covers the opening between the adjacent ends of the members 36 and 38 whereby positively to insure that the connecting link 26 cannot escape therethrough.

Preferably, the dimensions of the connecting link 24 are such that the greatest transverse dimension thereof is of the same order of magnitude as the maximum transverse dimension of the links 18 whereby the connecting link can lie substantially completely within the associated circumferentially extending groove 14. With the parts so dimensioned, the upper edge of the lock member 28 as viewed in Figures 2 and 4 through 7 of the drawings will lie beyond the tread surface 20. Accordingly, it is desirable that the lock member 28 be formed of some wear resistant material such as a high grade steel. It further is contemplated that in cases of extreme wear, a further protective member 50 will be applied thereto, the member 50 being for example a layer of "Stellite" or some similar wear resistant material.

The chains 16 may be applied to the tire 10 most readily if the tire is removed from the automobile or if the automobile is on a service rack. However, it is contemplated that the chain 16 can be applied while the tire is mounted on the vehicle and while the tire is supporting the vehicle on a support surface. To apply the chain 16 in such cases it is necessary to drive the tire onto the chain 16 stretched out on the support surface. The chain further must be positioned so that it lies within one of the grooves 14. The ends of the chain are then wrapped around the tire and the parts of the connector 22 positioned substantially as illustrated in Figure 2 of the drawing. With the chain in this position, the chain can be tightened sufficiently to permit interconnection of the connecting links 24 and 26 by the use of a tool such as the tool generally designated by the numeral 52 in Fig. 1 of the drawings. The tool 52 includes an elongated handle 54 having pivotally mounted on one end thereof a lever arm 56 having a hook 58 on the outer end thereof. Pivoted on the handle 54 intermediate the ends thereof is a second longer lever arm 60 having a hook 62 on the free end thereof. In the use of the tool 52, the hooks 58 and 62 are inserted in links 18 of the chain 16 with the handle 54 positioned as shown in solid lines. Movement of the handle 54 to the dashed line position will draw the chain 16 tight about the tire 10 and will permit interconnection of the connecting links 24 and 26 as illustrated in Figure 4 of the drawing. Subsequent release of the handle 54 will permit the natural resilience of the tire 10 to expand the chain 16 whereby to draw the parts to the position illustrated in Figure 5 of the drawing. With the parts in the position illustrated in Figure 5, the lock member 28 is in position positively to close the gap in the link 24 whereby positively to prevent inadvertent disengagement of the connecting link 26 from the connecting link 24.

It has been found that the chain 16 with only a portion of each of the links 18 thereof extending beyond the tread surfaces 20 gives good resistance to side slippage on glazed or icy surfaces without interfering with the traction properties of the tire 10 on snow covered surfaces. There is no objectionable rattling or bumping when using the chain 16. The speed of operation of the vehicle is not adversely effected and it has been found that chain 16 can be used at high speeds on the order of sixty miles per hour. Chains 16 have a long useful life as does the connector 22. Due to the construction of the connector 22, the chains 16 can be easily applied to the tire 10 and once applied will not inadvertently slip therefrom because of the presence of the lock member 28.

Although one preferred form of the invention has been shown and described for purposes of illustration, it is to be understood that various changes and modifications can be made therein without departing from the spirit and scope of the invention. Accordingly, the invention is to be limited only as set forth in the following claims.

I claim:

1. A tire chain for use with a tire having a circumferentially extending groove in the tread surface thereof, said tire chain comprising a plurality of interconnected chain links adapted to lie in the groove of an associated tire, the maximum transverse dimension of each link being such that only a portion thereof extends beyond the tread surface of the associated tire, a first link at one end of said tire chain and including a first side member having integral U-shaped portions at each end thereof and two shorter side members respectively attached to one of said U-shaped portions and extending toward each other and spaced apart a first predetermined distance with one of said U-shaped portions extending through the adjacent link, a second link at the other end of said tire chain and having a transverse dimension less than said predetermined distance to be received between the opposed ends of said shorter side members thereby to interconnect with said first link and to engage the other of said U-shaped members, and a lock member circumscribing and slidably mounted on said first link and having a hook portion engageable with said second link and a covering portion having a width greater than said first predetermined distance and being spaced from said hook portion a second predetermined distance such that said covering portion overlies and closes the gap between the ends of said shorter side members when said hook portion is disposed beside the other U-shaped member engaged by said second link, said lock member being slidable to a first position exposing the opposed ends of said shorter side members with said hook portion positioned adjacent to the opening between said shorter side members and disposed toward said other U-shaped member, said lock member being slidable to a second position in which said hook member is disposed beside said other U-shaped member and said covering portion overlies and covers the adjacent ends of said shorter side members, whereby when said lock member is in said first position said second link can be passed between the opposed ends of said shorter side members to engage with said hook portion and movement of said second link toward said other U-shaped member causes engagement thereof with said hook portion whereupon continued movement of said second link into engagement with said other U-shaped member moves said lock member so that the cover portion thereof overlies and positively closes the space between the opposed ends of said shorter side members, said second link positively holding said lock member in said second position during operation of the associated tire.

2. The tire chain set forth in claim 1, wherein a wear resistant member is mounted on the portion of the lock member extending beyond the surface of the associated tire.

3. In combination with a tire having a circumferentially extending groove in the tread surface thereof, a tire chain comprising a plurality of interconnected chain links adapted to lie in said groove, the maximum transverse dimension of each link being such that only a portion thereof extends beyond said tread surface, a first link at one end of said tire chain and including a first side member having integral U-shaped portions at each end thereof and two shorter side members respectively attached to one of said U-shaped portions and extending toward each other and spaced apart a first predetermined distance with one of said U-shaped portions extending through the adjacent link, a second link at the other end of said tire chain and having a transverse dimension less than said predetermined distance to be received between the opposed ends of said shorter side members thereby to interconnect with said first link and to engage the other of said U-shaped members, and a lock member circumscribing and slidably mounted on said first link and having a hook portion engageable with said second link and a covering portion having a width greater than said first predetermined distance and being spaced from said hook portion a second predetermined distance such that said covering portion overlies and closes the gap between the ends of said shorter side members when said hook portion is disposed beside the other U-shaped member engaged by said second link, said lock member being slidable to a first position exposing the opposed ends of said shorter side members with said hook portion positioned adjacent to the opening between said shorter side members and disposed toward said other U-shaped member, said lock member being slidable to a second position in which said hook member is disposed besides said other U-shaped member and said covering portion overlies and covers the adjacent ends of said shorter side members, whereby when said lock member is in said first position said second link can be passed between the opposed ends of said shorter side members to engage with said hook portion and movement of said second link toward said other U-shaped member causes engagement thereof with said hook portion whereupon continued movement of said second link into engagement with said other U-shaped member moves said lock member so that the cover portion thereof overlies and positively closes the space between the opposed ends of said shorter side members, said second link positively holding said lock member in said second position during operation of said tire.

References Cited in the file of this patent

UNITED STATES PATENTS

| | | |
|---|---|---|
| 985,884 | Clark | Mar. 7, 1911 |
| 1,285,597 | Beck | Nov. 26, 1918 |
| 1,293,528 | Palmer | Feb. 4, 1919 |